Patented Oct. 17, 1939

2,176,079

UNITED STATES PATENT OFFICE 2,176,079

CAKE

Morris B. Katzman, Chicago, Ill., assignor to The Emulsol Corporation, Chicago, Ill., a corporation of Illinois No Drawing. Application January 8, 1938, Serial No. 184,031

26 Claims. (Cl. 99—92)

My invention relates to improved unbaked and baked flour compositions and is particularly concerned with the preparation of cakes which are devoid of or substantially devoid of shortening.

Baked flour products of the non-shortening-containing type have long been known, one of the commonest types being cakes of the character of the well-known angel food cake which latter generally is made from a batter containing flour, sugar, beaten egg whites, salt, flavoring and generally a small percentage of cream of tartar or similar acidifying agent, with incorporated air as the principal leavening agent. Cakes of this type are generally characterized by a relatively open grain structure and they do not have the characteristic "shortness" and tenderness which distinguish cakes such as the conventional white and yellow layer cakes which are prepared from a batter relatively rich in shortening such as the conventional triglyceride oils and fats.

Baked flour products, such as angel food cake, which are devoid or substantially devoid of shortening, possess the marked disadvantage that, in general, the texture is such that the cake or the like possesses a "rubberiness" and the "chewability" characteristics of such cakes are decidedly different from cakes which are prepared from batters containing shortening. Nevertheless, because of the ease and simplicity of preparation, the relatively low cost, and the large volume obtained per unit of scaling weight, the baker generally prefers to sell cakes of this type although the consumer demand is relatively small compared to the demand for cakes of the type conventionally employing shortenings.

My present invention is concerned with the improvement of baked flour products, particularly cakes of the type of angel food cake, which are devoid of or substantially devoid of shortening.

A particular object of my invention is concerned with the preparation of novel and improved angel food cakes.

Another object concerns the provision of improved non-shortening-containing flour batters.

A further object is concerned with the provision of improved angel food cake batters.

A particular object of my invention relates to the improvement in volume of non-shortening-containing cakes of the type of angel food cake.

Other improvements relate to the betterment of the texture, grain, and "chewability" characteristics as well as the general outer appearance of cakes of the non-shortening-containing type such as angel food cake.

Other objects will appear in the light of the following detailed description of my invention.

I have found that when certain improving agents, hereinafter designated as reaction products of poly-phosphoric acid with alcohols, as hereinafter defined, are introduced into flour batters which are devoid or substantially devoid of shortening, such as the conventional angel food cake batters, the product when baked represents a startling improvement over similar products made without employing the novel teachings of my invention.

The improving substances which I employ herein in accordance with my invention are, in general, possessed of at least two groups, one having a hydrophile function and the other having a lipophile function in the molecule. The hydrophile function is performed primarily by a poly-phosphoric acid group or groups, tending to give the molecule of which it is a part an affinity for aqueous materials. The lipophile group is any radical having an affinity for oleaginous material such as oils, fats, hydrocarbons and the like and may comprise radicals such as hydrocarbon radicals, acyl or alkyl groups derived from aliphatic or fatty acids or their corresponding alcohols, or the like. The hydrophile polyphosphoric acid group or groups may be attached directly to the lipophile group or may be linked thereto through a polyhydroxy substance. In this latter case, the linkage between the polyhydroxy substance and the lipophile group or groups may be an ester or ether linkage.

Since there may be some question as to the exact chemical structure of the improving agents which I employ herein, I prefer to refer to, disclose and claim them as reaction products of poly-phosphoric acids with, in general, an alcohol or alcohols, the precise nature of the alcohols being set forth hereinafter.

The lipophile groups entering into the molecular structure of my improving substances may be of simple character as, for example, in reaction products of tetraphosphoric acid with straight chain alcohols such as hexyl alcohol, octyl alcohol, decyl alcohol, lauryl alcohol, and the like, or of branch chain alcohols such as 2-ethyl-hexanol-1, 2-butyl octanol-1, and the like.

Others of the improving substances of my invention are reaction products of polyphosphoric acids with polyhydroxy substances, the hydrogen of at least one hydroxy group of the polyhydroxy substance being replaced by an alkyl or acyl radical containing preferably at least four carbon atoms and, more advantageously, between 8 and 18 carbon atoms. Specific examples of improving agents which I may employ in accordance with my invention are as follows:

1. The reaction product of tetraphosphoric acid with mono-olein, ammonium salt.
2. The reaction product of pyro-phosphoric acid with diethylene glycol mono-ricinoleate, sodium salt.
3. The reaction product of pyro-phosphoric acid with mono-laurin.
4. The reaction product of tetraphosphoric acid with mono-laurin, sodium salt.
5. The reaction product of pyro-phosphoric acid with mono-acetin, sodium salt.
6. The reaction product of tetraphosphoric acid with di-butyrin, sodium salt.
7. The reaction product of pyro-phosphoric acid with mono-cetyl ether of sorbitol.
8. The reaction product of pyro-phosphoric acid with ethylene glycol mono-stearate.
9. The reaction product of pyro-phosphoric acid with the ethyl ether of ethylene glycol.
10. The reaction product of pentaphosphoric acid with mono-caprylic acid ester of diethylene glycol.
11. The reaction product of pyro-phosphoric acid with mixed coconut oil fatty acid mono-esters of diethylene glycol, ammonium salt.
12. The reaction product of tetraphosphoric acid with mono-butyl ether of diethylene glycol, sodium salt.
13. The reaction product of pyro-phosphoric acid with sucrose mono-oleate, sodium salt.
14. The reaction product of pyro-phosphoric acid with mixed coconut oil fatty acid mono- or diglycerides or mixtures of mono- and di-glycerides, ammonium salt.
15. The reaction product of tetraphosphoric acid with mono-oleic acid ester of diglycerol, sodium salt.
16. The reaction product of tetraphosphoric acid with the mono-octyl ether of glycerol, potassium salt.
17. The reaction product of pyro-phosphoric acid with di-caproin, sodium salt.
18. The reaction product of pyro-phosphoric acid with the mono-lauryl ether of diethylene glycol, sodium salt.
19. The reaction product of tetraphosphoric acid with the mono-melissic acid ester of mannitol, ammonium salt.
20. The reaction product of tetraphosphoric acid with the di-cetyl ether of sorbitol, potassium salt.
21. The reaction product of pyro-phosphoric acid with the di-stearic acid ester of triglycerol, potassium salt.
22. The reaction product of pyro-phosphoric acid with the mono-butyric acid ester of tartaric acid.
23. The reaction product of tetraphosphoric acid with monopropionic acid ester of mucic acid, sodium salt.
24. The reaction product of pyro-phosphoric acid with mono-palmitic acid ester of glycerol, ammonium salt.
25. The reaction product of tetraphosphoric acid with mono-myristic acid ester of glycerol, sodium salt.
26. The reaction product of penta-phosphoric acid with the di-oleic acid ester of diethylene glycol.
27. The reaction product of pyro-phosphoric acid with octyl alcohol.
28. The reaction product of pyro-phosphoric acid with lauryl alcohol.
29. The reaction product of pyro-phosphoric acid with mixed coconut oil fatty alcohols.
30. The reaction product of tetraphosphoric acid with octadecyl alcohol.
31. The reaction product of pyro-phosphoric acid with the mixture of alcohols derived from the reduction of sperm oil.
32. The reaction product of penta-phosphoric acid with ricinoleyl alcohol.
33. The reaction product of tetraphosphoric acid with butyl alcohol.
34. The reaction product of pyro-phosphoric acid with oleyl alcohol.

It will be seen that I may select many different types of compounds as lipophile groups for the preparation of the improving agents which I employ herein, particularly those having at least eight carbon atoms although, in some instances, the lipophile group or groups may contain as low as four carbon atoms and even less. For example, the following compounds may be utilized as sources of lipophile groups, and reaction products of poly-phosphoric acids therewith may be prepared by procedures described more fully hereinafter: butyl alcohol, amyl alcohol, hexyl alcohol, heptyl alcohol, octyl alcohol, nonyl alcohol, decyl alcohol, undecyl alcohol, lauryl alcohol, myristyl alcohol, cetyl alcohol, oleyl alcohol, linoleyl alcohol, stearyl alcohol, ricinoleyl alcohol, palmitoleyl alcohol, melissyl alcohol, ceryl alcohol, carnaubyl alcohol, myricyl alcohol, branched chain octyl, decyl, dodecyl, tetradecyl, hexadecyl and octadecyl aliphatic alcohols as, for example, 2-ethyl hexanol-1, 2-n-butyl octanol-1, 2-butyl tetradecanol-1, and, in general, the higher molecular weight saturated and unsaturated aliphatic straight chain and branched chain alcohols. Preferably, the alcohols which I utilize are those corresponding to the fatty acids occurring in triglyceride oils and fats of vegetable or animal origin, natural or hydrogenated, such as corn oil, cottonseed oil, sesame oil, coconut oil, palm kernel oil, sunflower seed oil, lard, tallow, soya bean oil and the like, those alcohols containing from 12 to 18 carbon atoms being preferred. I may also employ cyclo-aliphatic or ali-cyclic alcohols such as the sterols, as, for example, cholesterol, iso-cholesterol, phytosterol, sitosterol, hydro-aromatic alcohols such as abietol, and such unsaturated alcohols as linalool, citronellol, geraniol and the like. Also included within the class of alcohols which may be employed are such compounds as the hydroxy and alpha-hydroxy higher aliphatic and fatty acids as, for example, ricinoleic acid, alpha-hydroxy stearic acid, alpha-hydroxy lauric acid, dihydroxy stearic acid, i-hydroxystearic acid, alpha-hydroxy palmitic acid, and the like, as well as esters of hydroxy-fatty acids, such as ethyl ricinoleate, castor oil, butyl alpha-hydroxystearate, cetyl hydroxystearate, and the like.

The term "alcohols", as employed herein, is intended to include alcohols which may or may not contain other groups such as carboxylic, halogen, sulphonic, sulphate, or other radicals. The alcohols obtainable by substituting alkyl or acyl radicals, preferably of high molecular weight, in place of the hydrogen of one or more hydroxy groups of polyhydroxy substances or polyhydric alcohols, it being understood that at least one hydroxy group attached to the nucleus of the polyhydroxy substance or polyhydric alcohol remains, are also within the scope of the alcohols from which the reaction products which I employ herein may be produced. As examples of such alcohols may be mentioned partially esterified or partially etherified sugars and sugar alcohols such as monolauric acid ester of sucrose, monostearic acid ester of dextrose, monopalmitic acid ester of mannitol, dicaproic acid ester of maltose, mono-octyl ether of sorbitol, monolauryl ether of pentaerythritol, monolauric acid ester of pentaerythritol, and the like; the monoglycerides and diglycerides, preferably of the higher fatty acids, as, for example, monolaurin, monomyristin, monostearin, distearin, diolein, dicaproin, dimyristin, monolauryl ether of glycerol, di-cetyl ether of glycerol, monostearic acid ester of diethylene glycol, monolauric acid ester of ethylene glycol, and the like.

It is, of course, obvious that the alcohols may be prepared in accordance with any desired method. For example, these alcohols may be prepared by the so-called Bouveault and Blanc method or, alternatively, by the reduction or catalytic reduction with hydrogen of natural or hydrogenated animal or vegetable fats and oils or fatty acids in accordance with well-known practices. Again, the alcohols may be derived from synthetic processes such as by the oxidation of hydrocarbons or they may be prepared by saponification of waxes and the like. Alternatively, they may be prepared by reduction of aldehydes or by the Grignard reaction. Still other methods known in the literature may likewise be employed if desired or deemed expedient. It is likewise apparent that mixtures of the foregoing or other alcohols may be utilized as, for example, the mixture of alcohols resulting from the hydrogenation of coconut oil or the free fatty acid of coconut oil. Lauryl alcohol comprises about 45% of the total alcohol mixture, the remaining alcohols running from $C_6$ to $C_{18}$. The reaction products of poly-phosphoric acids with these mixtures of alcohols function in substantially the identical manner as the reaction product of poly-phosphoric acids with substantially pure alcohols. Again, mixtures of alcohols such as are present in the so-called sperm oil alcohols, as well as those present in wool-fat, may equally efficaciously be utilized. Indeed, these higher molecular weight alcohols are generally, if, indeed, not almost invariably, offered on the market in the form of mixtures of different alcohols. If desired for any specific purpose, special fractions which predominate in a certain particular higher molecular weight alcohol may be utilized or, if so desired, the reaction products with poly-phosphoric acids may be prepared from a single, substantially pure alcohol. Since, obviously, for example, the reaction products of poly-phosphoric acids with lauryl alcohol are the same irrespective of how the alcohol is prepared, the reaction products thereof with poly-phosphoric acids are the same and function in like manner. Similarly, reaction products of poly-phosphoric acids with commercial mixtures of alcohols containing predominant amounts of, for example, lauryl alcohol function essentially identically the same as the reaction products of poly-phosphoric acids with substantially pure lauryl alcohol. It will be seen, therefore, that the source of the alcohols or higher molecular weight alcohols from which my reaction products are prepared is entirely immaterial.

So far as my improving substances are concerned which are derivatives of polyhydroxy substances, I may select many different types of compounds as lipophile groups which are to be linked to the polyhydroxy substances, principally compounds having lipophile radicals of relatively higher molecular weight. For example, the following materials may be utilized as sources of lipophile groups: carboxylic or fatty acids such as butyric acid, caprylic acid, caproic acid, capric acid, saturated and unsaturated higher molecular weight aliphatic acids such as the higher fatty acids containing at least 6 carbon atoms and including melissic acid, stearic acid, oleic acid, ricinoleic acid, linoleic acid, lauric acid, myristic acid, palmitic acid, mixed higher fatty acids derived from animal or vegetable sources, for example, lard, coconut oil, sesame oil, corn oil, cottonseed oil, sardine oil, partially or completely hydrogenated animal and vegetable oils such as those mentioned, fatty acids derived from various waxes such as beeswax, spermaceti, montan wax, and carnauba wax, hydroxy higher aliphatic or fatty acids such as 1-hydroxy-stearic acid, alpha hydroxy stearic acid, alpha hydroxy-palmitic acid, alpha hydroxy coconut oil fatty acids and similar hydroxy and alpha hydroxy higher fatty acids, carboxylic acids derived by oxidation and other methods from petroleum, hydroaromatic acids such as naphthenic acid, abietic acid, hydroxy aromatic acids such as hydroxy benzoic acid, aromatic acids such as benzoic acid, naphthoic acid, and the like.

As indicated, instead of reacting the poly-phosphoric acids with esters of polyhydroxy substances, I may also effect the reaction of the poly-phosphoric acid with ethers of polyhydroxy substances. The esters as well as the ethers of the polyhydroxy substances which may be employed for reaction with poly-phosphoric acid to produce the reaction products which I utilize herein may be prepared in accordance with methods well known in the literature and which, therefore, need not be described herein.

The polyhydroxy substances which provide the linkage between the lipophile group or groups and the poly-phosphoric acid radical or radicals may be selected from a large class and include glycerol; glycols such as ethylene glycol, propylene glycol, trimethylene glycol, butylene glycol and the like; polyglycols such as diethylene glycol; polyglycerols such as diglycerol, triglycerol, tetraglycerol and the like including mixtures thereof; sugars such as dextrose, sucrose, xylose, galactose, fructose, maltose, mannose and the like; sugar alcohols such as arabitol, mannitol, sorbitol and dulcitol; and polyhydroxy carboxylic acids such as tartaric acid, mucic acid, saccharic acid, gluconic acid, glucuronic acid, gluonic acid, mannonic acid, trihydroxyglutaric acid, glyceric acid, carboxylic oxidation products of polyglycerols, other of similar character and hydroxyethyl and hydroxypropyl ether derivatives of the above, as for example:

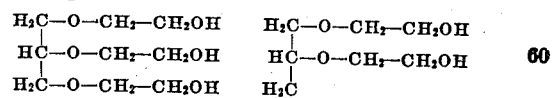

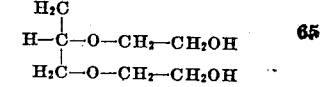

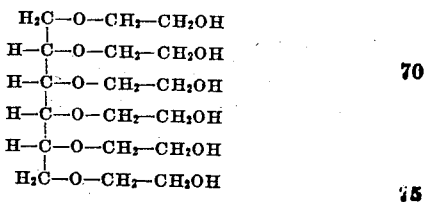

Procedural details of the methods by means of which the improving materials employed in my invention are prepared may be varied. The exact method employed should be determined primarily by considering the type of reacting constituents of the final substance to be produced. In all instances the compound reacted with the poly-phosphoric acid contains either at least one double bond or a reactive hydroxyl radical. The molal ratios of the reacting constituents may be varied to produce products having different properties and characteristics. A condensing agent and/or solvent may be added where required.

In order that others skilled in the art may even more fully understand how to prepare the improving materials which I employ herein in accordance with my invention, I shall describe various specific embodiments in detail. It is to be understood, however, that the following examples are given only by way of illustration and are not to be construed as limitative of the methods which may be employed in the production of the reaction products which I utilize herein. For example, it is evident that the proportions of reacting constituents, temperatures of reaction, time of reaction, and the like represent factors which may be varied, all within the skill of those versed in the art in the light of my teachings herein.

Example I

To 115 grams of pyrophosphoric acid at 90 degrees C. there is added with stirring 71 parts of mono stearin at 85 degrees C. The temperature of the mass rises to approximately 110 to 115 degrees C. after which it is allowed to cool. The resulting solid mass is mixed with a cold solution of 80 grams of sodium hydroxide dissolved in 400 cc. of water and the mixture is well stirred until all of the acid is neutralized. The solution is kept cold by means of an ice bath and also by adding small amounts of ice to the mixture. The resulting product is a thin paste.

Example II

To 69 parts by weight of tetraphosphoric acid, previously heated to 90 degrees C., 27 parts by weight of commercial octadecyl alcohol, also previously heated to 90 degrees C., were slowly added with vigorous stirring. The temperature rose to about 100 degrees C. and, at that temperature, the reaction product was a viscous mass, light brown in color and odorless.

Example III 26.8 parts by weight of oleic alcohol, previously heated to approximately 90 degrees C., were added slowly, with stirring, to 34.8 parts by weight of tetraphosphoric acid, also previously heated to 90 degrees C. The temperature rose to 125 degrees C. and, at this temperature, the reaction product was a viscous mass, medium brown in color. At room temperatures, the product became a heavy, nearly solid paste.

Example IV 27 parts by weight of octadecyl alcohol, previously heated to approximately 90 degrees C., were added slowly, with vigorous stirring, to 34.8 parts by weight of tetraphosphoric acid, also previously heated to approximately 90 degrees C. The temperature rose during the reaction to 100 degrees C. at which point 18.2 parts by weight of powdered mannitol were slowly added. The mass became thick and, upon stirring for several minutes, the reaction mass became much thinner. The product was then heated to 125 degrees C. for several minutes with vigorous stirring. In place of mannitol, other polyhydroxy substances such as dextrose could be employed.

Example V

A mixture of 2 and ½ parts of cottonseed oil, 2 and ½ parts of hydrogenated cottonseed oil having an iodin value of 68 to 70, and 5 parts of glycerin are heated to a temperature of 250 to 260 degrees C. for 2 hours using 0.005 part of sodium hydroxide as a catalyst. The reaction mixture is heated in a non-oxidizing atmosphere, such as carbon dioxide, and is continuously stirred in any suitable way during the entire reaction. After the completion of the reaction, the mass is permitted to stand and the excess glycerin, which constitutes the bottom layer, is drawn off from the desired monoglycerides which comprise the top layer.

To 36 parts of pyrophosphoric acid at room temperature (30 degrees C.) is added 77 parts of the above described mono glyceride at room temperature (30 degrees C.) The two components are then well mixed and the temperature rises to approximately 55 degrees C. The reacting mass is then mixed for about 30 minutes longer until the temperature thereof drops back to approximately 30 degrees C. The resulting product is a light brown plastic material. This is allowed to stand for about 15 hours and is then transferred to a mortar to which is slowly added 24 parts of sodium hydroxide dissolved in 90 parts of water. During the entire neutralization, the mass is kept at a temperature between 5 and 10 degrees C. with powdered dry ice. Upon each addition of alkali, the mass is intimately mixed. The final product is a cream colored somewhat limpid paste.

Example VI 21 parts by weight of commercial lauryl alcohol, previously heated to 90 degrees C., were slowly added with stirring to 69.6 parts by weight of tetraphosphoric acid, also previously heated to 90 degrees C. The temperature rose to 110 degrees C. The reaction product was a yellow paste, soluble in water, and had excellent foaming properties. 20 parts by weight of the resulting product were dissolved in ether, the insoluble material filtered off, and ammonia gas passed into the filtrate. The resulting product was an excellent foaming agent.

Example VII 42 parts by weight of commercial lauryl alcohol, previously heated to 90 degrees C., were slowly added, with stirring, to 69.6 parts by weight of tetraphosphoric acid. The temperature rose to 125 degrees C. and the reaction product, at room temperatures, was a yellow paste. 32 parts by weight of triethanolamine were dissolved in 60 parts by weight of water and 20 parts by weight of the above prepared reaction product were added with stirring at room temperature. The final solution was neutral to litmus, was clear and transparent, and had excellent foaming properties.

Example VIII

Approximately 25 parts of the coconut oil mono fatty acid ester of ethylene glycol is poured into about 54 parts of pyrophosphoric acid and the two are mixed together until homogeneous. When the temperature has ceased rising, the mass is heated to 90 degrees C. with stirring. If no further temperature rise is noted, the mass is permitted to cool and is then extracted with ether. The ether extract may be neutralized by passing into the same a gaseous stream of ammonia until a definite color change is noted.

In place of the coconut oil mono-fatty acid ester of ethylene glycol, I may use the coconut oil mono-fatty acid ester of diethylene glycol.

Example IX 62 parts by weight of diolein, previously heated to 90 degrees C., were added slowly with stirring to 34.8 parts by weight of tetraphosphoric acid. The temperature rose after a few minutes to 126 degrees C. At 120 degrees C. the reaction product was a red-brown liquid. On cooling, it became substantially thicker.

Example X

Approximately 77 parts of mono stearin (washed and dried) is heated to 90 degrees C. and is added to about 18 parts of pyrophosphoric acid also heated to the same temperature and the two are mixed until a homogeneous mass is obtained. The mass is stirred continuously until the heat of reaction ceases after which the mass is extracted with ether and neutralized and the ether evaporated in the same way as shown in Example VIII hereinabove.

Example XI 30.8 parts by weight of mixed coconut oil mono fatty acid esters of diethylene glycol, at a temperature of about 90 degrees C., were mixed with 34.8 parts by weight of tetraphosphoric acid, the ester being added to the acid as described in the above examples. The temperature rose to 136 degrees C., at which temperature the reaction product was a liquid of medim brown color. On cooling, it became a paste. This product was then neutralized in one case with triethanolamine and in another case with mono-ethanolamine. In each case, products resulted having excellent foaming properties.

Example XII

A mixture of 641 parts of myristic acid and 700 parts of glycerine is heated in an atmosphere of carbon dioxide at about 220 degrees C. for 2 hours, the moisture formed being permitted to escape. Upon cooling, a yield of 900 parts of mono myristin is obtained. 50 parts of the mono myristin is washed three times with water at 90 degrees C. and is dried by dissolving the washed substance in ether and adding enough anhydrous sodium sulphate to take up all of the moisture. The ether extract is then filtered and slightly evaporated. A crystalline substances comes out of the ether solution, the mass is filtered and is then thoroughly dried. Into 17 parts of pyrophosphoric acid at 90 degrees C. there are stirred 10 parts of the crystallized mono myristin at 90 degrees C. whereupon the temperature rises to approximately 100 degrees C. The mixture is then heated to 120 degrees C. for about 10 minutes and is then allowed to cool. The resulting solid mass is then extracted with ether, the extract is centrifuged and filtered and is then neutralized with a stream of gaseous ammonia. A white precipitate comes down which is filtered off and is then thoroughly dried. The resulting product is a white somewhat plastic solid.

While the illustrative examples listed hereinabove represent, in some cases, single substances, it must be understood that the invention is not limited to the use thereof. Indeed, in practice, it is frequently, if, indeed, not invariably, more convenient to prepare a mixture of the reaction products and to use such mixture. For example, I may prepare mixtures of monoglycerides and diglycerides of higher fatty acids by any convenient method, as, for example, by direct esterification of glycerol with higher fatty acids or by re-esterification of a triglyceride oil or fat with glycerol, preferably in the presence of a catalyst, and then react the resulting mixture with poly-phosphoric acids. Moreover, in place of pure monostearin, for example, I may utilize a commercial product which contains small proportions of mono-palmitin and mono-olein, or small proportions of the di-fatty acid esters of glycerol.

The polyhydroxy substances which provide the linkage between the lipophile group or groups and the hydrophile poly-phosphoric acid group or groups, in those of the reaction products which I employ herein which are derivatives of polyhydroxy substances, may be conveniently considered as falling into two groups. The first of these groups includes compounds containing less than four hydroxy groups and is exemplified by glycerin, glycols and polyglycols. The second group contains those substances which have more than three hydroxy groups, examples of which are the sugars and sugar alcohols, polyglycerols such as di- and tri-glycerol, etc. It will be understood that, in this class of the reaction products which I employ herein, there may be present one or more lipophile radicals and one or more hydrophile poly-phosphoric acid radicals attached to the polyhydroxy substance. Thus, for example, I may react one mol of a poly-phosphoric acid with one mol of the mono-oleic acid ester of glycerol or, alternatively, I may react two or more mols of a poly-phosphoric acid with one mol of the mono-oleic acid ester of glycerol. Similarly, I may react one or more mols of a poly-phosphoric acid with one mol of the distearic or other fatty acid esters of di- or triglycerol or the like. In a similar way, as described above, instead of the acyl derivatives of the polyhydroxy substances, I may employ the corresponding alkyl or ether derivatives.

While, in general, I react poly-phosphoric acids with a compound containing an alcoholic hydroxyl group, I may, in certain instances, utilize compounds having double bonds and no esterifiable hydroxy groups for reaction with poly-phosphoric acids. Illustrative of such compounds are, for example, tri-olein, mono-olein-distearine, corn oil, olive oil, cocoa butter, lard, and the like. In castor oil, for example, double bonds as well as free hydroxy groups are present.

I may utilize the reaction products as such or they may be neutralized with suitable anti-acid materials. In this connection, considerable latitude and modification may be exercised. In general, inorganic as well as organic anti-acid agents may be employed and the neutralization may be in whole or in part. Examples of inorganic and organic anti-acid agents which may be used satisfactorily are bicarbonates of the alkali metals, potassium hydroxide, potassium carbonate, metallic sodium, sodium hydroxide, sodium oxide, sodium carbonate, ammonium hydroxide, ammonia gas, potassium stearate, sodium stearate, nontoxic and innocuous organic anti-acid nitrogenous materials, as well as other anti-acid materials which serve to replace hydrogen of the polyphosphoric acid group or groups by cations such as sodium, potassium, ammonium, etc., the term "cation" being used to include, in general, atoms or radicals which are regarded as bearing a positive charge. The reaction products may be neutralized to methyl orange, litmus, or phenolphthalein. As a general rule, if the salts of the reaction products are employed, it is preferred to utilize the sodium, potassium, ammonium or other soluble salts.

While I have described various examples of the preparation of the reaction products which I employ in accordance with my invention, it must be understood that the scope of the class of reaction products is by no means limited by these methods. Other convenient methods may be used. This also applies, and particularly so, to supplementary procedures of purification or isolation which lie strictly within the province of the skill of any qualified chemist whose procedures in each instance must be governed by the properties of the materials concerned and by the degree or character of the purity desired.

In addition to the pyrophosphoric acid and tetraphosphoric acid derivatives which I have specifically described herein, other poly-phosphoric acid derivatives may also be utilized as, for example, those prepared from poly-metaphosphoric acid, tri, penta-, and hexa- and higher poly-phosphoric acids. Similarly, I may utilize mixtures of such poly-phosphoric acids as, for example, a mixture of pyro-phosphoric acid and tetra-phosphoric acid, in producing my improving agents in order to obtain reaction products having varying efficacies. In a case where, for example, equal parts of pyro-phosphoric acid and tetra-phosphoric acid are employed in producing the reaction products, the means $P_2O_5$ content of the mixture of acids will correspond to that of tri-phosphoric acid.

As illustrative of the unusual results emanating from the practice of my invention, reference may be had to the use of the improving agents in angel food cakes.

A standard angel food cake, for comparison purposes, was first prepared from the following formula, expressed in parts by weight, in this instance, grams:

| | |
|---|---|
| Egg whites | 600.0 |
| Finely granulated sugar | 600.0 |
| Cream of tartar | 6.5 |
| Cake flour | 218.0 |
| Salt | 3.5 |
| Vanilla | 6.0 |

The egg whites were preliminarily whipped or beaten for one minute. A sifted mixture of the cream of tartar, salt and 150 grams of sugar was then added to the beaten egg whites in the space of about a minute and the mass was whipped for an additional eleven minutes. The remaining 450 grams of sugar and the flour, sifted three times, were then added, with the beater running at low speed, gradually over a period of one-half minute, and the mass was mixed for another one-half minute. The vanilla was then mixed in and the cake was baked in an electric oven at a temperature of 350 degrees F. for a period of 28 minutes.

In accordance with one example of the practice of my invention, the same procedure described hereinabove was followed with the exception that 1.8 grams of a reaction product of 1 mol of octadecyl alcohol with two mols of tetraphosphoric acid was employed. In order to effect a uniform dispersion of the reaction product throughout the batter, said reaction product was preliminarily macerated in a mortar with 12 cc. of water and the resulting dispersion incorporated into the liquid egg whites.

The contrast between the standard cake and the cake produced in accordance with my invention was marked. The outer appearance of the standard cake and the color of the crumb thereof were distinctly inferior to the other cake. The volume of the standard cake was 1055 cc. as against 1240 cc. for the other cake. Furthermore, the texture and "chewability" of the standard cake were definitely inferior to the other cake.

In another example, using the same standard and following the same procedure but employing 1.1 grams of a reaction product of one mol of tetraphosphoric acid with one mol of octadecyl alcohol, prepared in accordance with the general procedure described hereinabove, the contrast between the standard cake and the cake prepared as described in accordance with my invention was marked. The color of the crumb of the standard was somewhat whiter than that of the cake produced in accordance with my invention but the grain of the latter was far better and the texture more velvety. In addition, the volume of the cake produced in accordance with my invention was 1200 cc. as against a volume of 1055 cc. for the standard.

In another case, still employing the same procedure and the same standard formula as described hereinabove but employing 2.0 grams of a reaction product of one mol of monostearin with two mols of tetraphosphoric acid as the improving agent, the following results were observed: The crumb of the cake baked in accordance with my invention was distinctly whiter than the crumb of the standard and also the cell structure of the standard, though good, was decidedly inferior to that of the cake produced in accordance with my invention. The volume of the standard in this case was 1110 cc. as against 1265 cc. for the cake produced in accordance with my invention.

In another baking test performed under the conditions described hereinabove, the improving agent consisted of 1.8 grams of a reaction product prepared from one mol of lauryl alcohol with two mols of pyro-phosphoric acid. The crumb was whiter, the cell structure superior and the texture was more delicate and more velvety in the cake produced in accordance with my invention than in the standard. In addition, the volume of the standard was substantially less than that of the cake made in accordance with my invention.

In another baking test, employing 1.8 grams of an improving agent made by reacting one mol of octyl alcohol with two mols of tetraphosphoric acid, in accordance with the general procedure described hereinabove, the results were as follows: While the general appearance of the cake produced in accordance with my invention was similar to that of the standard, the crumb of the former was whiter and its texture was more delicate and fluffier than the standard. The volume of the standard in this case was 1052 cc. as against 1195 cc. for the cake produced in accordance with the teachings of my invention.

In still another baking test, employing as an improving agent 1.8 grams of a reaction product produced from one mol of lauryl alcohol with two mols of tetraphosphoric acid, the results were as follows: The color of the crumb of the cake produced in accordance with my invention was very white, almost chalk-white, as against a creamy white crumb in the standard. The texture of the cake produced in accordance with my invention was more fluffy than the standard and the volume was 1480 cc. as against 1052 cc. for the standard. The cake containing the lauryl alcohol-tetraphosphoric acid reaction product was markedly superior in all respects, regardless of the criterion chosen for purposes of comparison.

Again, employing as an improving agent 1.8 grams of a reaction product produced from one mol of monostearin with three mols of pyrophosphoric acid, the results were as follows: The color of the crumb was distinctly whiter than that of the standard. In addition, the grain was closer, the texture was more velvety and the volume was 1095 cc. as against 1052 cc. for the standard.

In still another baking test using as the improving agent 2.0 grams of a reaction product of one mol of monostearin with two mols of pyrophosphoric acid, the resulting cake had an excellent crumb color, the grain was quite uniform and the texture velvety. The volume was also substantially larger than that of the standard. In all, the cake produced in accordance with my invention was definitely superior to that of the standard.

Another baking test employing 1.8 grams of a reaction product of one mol of octadecyl alcohol with two mols of pyrophosphoric acid resulted in the production of a cake of much greater volume than that of the standard and with better crumb color and texture.

I have obtained improvements of similar kind and magnitude in cakes similarly prepared and at corresponding hydrogen ion concentrations but in which the improving agents were salts prepared by neutralizing the poly-phosphoric acid reaction products utilized in the illustrative angel food examples hereinabove described. For instance, utilizing 1.1 grams of the sodium salt of the reaction product of tetraphosphoric acid with octadecyl alcohol, the cake was superior in all respects to the standard, having a whiter crumb color, a more velvety and delicate structure and a volume of 1237 cc. as against 1110 cc. for the standard.

In order to show readily the marked advantages and unusual effects brought about by my invention, I have, as described above, adopted a standard cake and procedure of making it, following the same general procedure in illustrating the features of my invention in order properly to compare the results. It will, of course, be evident that different standards may be adopted and the practice of the invention may be effected with different formulae and different mixing procedures. Thus, for example, any known formulae or modifications of known formulae for preparing angle food cakes and the like may be employed. Similarly, various mixing procedures may be resorted to as, for example, mixing all of the sugar with the egg whites prior to the addition of any of the flour, and the like. In all such cases, so far as I am aware, the practice of my invention brings about distinct and important improvements.

In general, I have found that a pH of 4.0 to 6.0, and preferably 5.0 to 5.5, of the batter produces good results. However, the pH range may vary considerably with the production of satisfactory baked products and the mentioned pH ranges are to be considered preferable but in no sense limitative of the scope of my invention.

While the most outstanding utility of the improving agents in accordance with my present invention appears to lie in conjunction with the preparation of flour batters and cakes of the type known as angel food, the principles of my novel teachings may also be employed in the preparation of other flour compositions, flour batters and cakes which are devoid or substantially devoid of shortening, particularly those which do not employ a leavening agent such as baking powder or the like but rely upon the incorporation of air in the batter to provide the leavening action. Into this category, for example, fall certain types of sponge cakes and baked flour products used in making roll cakes. In this connection, as well as in general, it must not be assumed that in every case will every one of the advantages result which I have stated above emanate from the practice of my invention, nor will those that do necessarily manifest themselves to the same degree in every instance. In all cases, however, so far as I am aware, at least one and, in general, several advantages will result from following my novel teachings herein.

In place of egg whites or egg albumen, I may, in certain cases substitute therefor, in whole or in part, proteins or protein-like materials which function similarly to egg whites or egg albumen, particularly with respect to incorporation of air by beating or similar mechanical treatment. Thus, for example, the protein ingredient may take the form of de-fatted soya bean flour, proteinaceous extracts of soya bean, milk whey in either liquid, concentrated or desiccated form, and the like. For convenience, I consider these materials, including egg whites and egg albumen, as "beatable proteins."

In the preparation of the flour compositions of my invention, I prefer to preliminarily admix the poly-phosphoric acid reaction products with the egg material or beatable protein prior to whipping or beating the same to incorporate air therein, particularly since the stability and character of the resulting foam are materially improved over such properties of untreated egg material or beatable proteins.

It will be understood that the reaction products may be incorporated into the batter in any suitable manner, care being taken, however, to effect a substantially uniform distribution thereof throughout the batter. Since the amount of the reaction product incorporated into the batter is relatively small, giving due regard to the fact that the proportions thereof may be rather widely varied as pointed out hereinafter, I find it advisable to adopt the method of incorporation described hereinabove. Any other suitable or desired method may, however, be employed.

I have previously indicated that the practice of my invention brings out improvements not only in the final baked products but usually also in the batters from which such products are baked. In general, this improvement manifests itself in enhanced smoothness and fluffiness, excellent body and stability and increased volume resulting principally from incorporation of additional air.

Since the practice of my invention generally brings about a substantial increase in volume, lower scaling weights may, if desired, be employed with the obtention of as great a volume of cake as would result were a larger scaling weight employed if methods heretofore known were utilized. Alternatively, if the same scaling weight is used, a cake having a substantially increased volume is obtained. In certain instances, by adjustment of proportions or selection of particular reaction products or both, the improvements can be directed more towards improvement in color, grain, texture, "chewability" and general all-round appearance of the baked product or cake and volume increase may be a secondary matter. Under any circumstances, the improvements which result, into whatever fields they may be categorized, are substantial.

It will, of course, be appreciated that reaction products will be employed concerning the edibility of which no question can arise. Similarly, it will be advantageous to utilize reaction products which are free or substantially free of odors and flavors which might be objectionable in food products although, in view of the fact that the reaction products are generally employed in relatively small proportions, this matter will offer no difficulty. While, in the description of the reaction products hereinabove, I have disclosed some products which might be considered unsuitable for edible purposes, as, for example, reaction products in which a naphthoic or similar acid radical is present, such compounds have been mentioned to illustrate the breadth and scope of the principles of my invention rather than as practical examples of reaction products which necessarily would be suitable from the standpoint of edibility. Those skilled in the art will obviously be able readily to select suitable edible reaction products for specific purposes in the light of my teachings herein.

It will also be appreciated that the proportions of the improving substances or reaction products may vary within relatively wide limits without departing from the spirit of my invention. Thus, for example, I may employ as little as 0.1%, based on the weight of the batter as a whole, or even less, and as much as 0.5%, based upon the weight of the batter as a whole, or even more. The exact amount will naturally depend upon the potency of the particular reaction product employed, the character of the flour and egg whites, the specific nature of the batter or cake which is to be produced, the particular batter procedure employed, and the character of the results sought, that is, whether the improvement desired be principally with respect to volume, grain or texture or the like. As a general rule, between 0.15% and 0.25%, based upon the weight of the batter as a whole, will be satisfactory in most cases.

By the term "reaction product of poly-phosphoric acids with * * *", as used herein and in the appended claims, I intend to include not only the unneutralized reaction product but also the product either partially or completely neutralized with suitable anti-acid materials as previously described.

The term "higher", as used herein and in the claims with reference to higher molecular weight alcohols or in similar expressions, will be understood to mean at least six carbon atoms, unless otherwise specifically stated.

This application is a continuation-in-part of my application, Serial No. 174,157, filed November 12, 1937.

What I claim as new and desire to protect by Letters Patent of the United States is:

1. A non-shortening-containing cake of the angel food type containing flour, beatable protein, sugar, moisture, and a proportion of a reaction product of a poly-phosphoric acid with an alcohol containing at least four carbon atoms.

2. A non-shortening-containing cake of the angel food type containing flour, beatable protein, sugar, moisture, and a proportion of a reaction product of a poly-phosphoric acid with an alcohol corresponding to the alcohols derivable from triglyceride oils, fats, waxes, and higher fatty acids.

3. A non-shortening-containing cake of the angel food type containing flour, beatable protein, sugar, moisture, and a proportion of a reaction product of a poly-phosphoric acid with an alcohol in the form of a polyhydroxy substance wherein the hydrogen of at least one hydroxy group of said polyhydroxy substance is replaced by a radical selected from the group consisting of alkyl and acyl radicals containing at least four carbon atoms.

4. A baked flour product, substantially free of shortening, and containing flour, egg whites, sugar, moisture, and a small proportion of a reaction product of a poly-phosphoric acid with an alcohol containing at least four carbon atoms.

5. An angel food cake containing flour, egg whites, sugar, moisture, and a small proportion of a reaction product of pyro-phosphoric acid with an aliphatic alcohol containing at least six carbon atoms.

6. An angel food cake containing flour, egg whites, sugar, moisture, and a small proportion of a reaction product of pyro-phosphoric acid with a straight chain aliphatic alcohol containing from 12 to 18 carbon atoms.

7. A flour batter, substantially devoid of shortening, containing flour, egg whites, sugar, moisture, and a small proportion of a reaction product of pyro-phosphoric acid with an alcohol corresponding to the alcohols derivable from triglyceride oils, fats, waxes, and higher fatty acids.

8. A baked flour product, substantially devoid of shortening, containing flour, egg whites, sugar, moisture, and a small proportion of a reaction product of pyro-phosphoric acid with lauryl alcohol.

9. An angle food cake containing flour, egg whites, sugar, moisture, and a small proportion of a reaction product of pyro-phosphoric acid with octadecyl alcohol.

10. A baked flour product, substantially devoid of shortening, containing flour, egg whites, sugar, moisture and a small proportion of a reaction product of pyro-phosphoric acid with an alcohol in the form of a polyhydroxy substance wherein the hydrogen of at least one hydroxy group of said polyhydroxy substance is replaced by a radical selected from the group consisting of alkyl and acyl radicals containing at least four carbon atoms.

11. A baked flour product, substantially devoid of shortening, containing flour, egg whites, sugar, moisture, and a small proportion of a reaction product of pyro-phosphoric acid with an alcohol in the form of an aliphatic polyhydroxy substance wherein the hydrogen of at least one hydroxy group of the aliphatic polyhydroxy substance is replaced by a higher molecular weight acyl radical, said polyhydroxy substance being a member of the group consisting of glycerol, glycols, polyglycerols, polyglycols, sugars, sugar alcohols, and hydroxy-carboxylic acids.

12. An angel food cake containing flour, egg whites, sugar, moisture, and a proportion of a reaction product of pyro-phosphoric acid with an alcohol in the form of an aliphatic polyhydric alcohol wherein at least one hydroxy group of the alcohol has its hydrogen replaced by an acyl group containing at least four carbon atoms.

13. A cake batter, substantially devoid of shortening, containing flour, egg whites, sugar, moisture, and a small proportion of a reaction product of pyro-phosphoric acid with an alcohol in the form of a fatty acid monoglyceride, the fatty acid radical containing at least four and preferably from twelve to eighteen carbon atoms.

14. The method of preparing non-shortening-containing cakes of the angel food type having excellent volume, taste and texture, comprising providing a body of beaten egg whites having dispersed therein a proportion of a reaction product of a poly-phosphoric acid with an alcohol containing at least four carbon atoms and then folding sugar and flour thereinto.

15. The method of preparing non-shortening-containing cakes of the angel food type having excellent volume, taste and texture, comprising providing a body of beaten egg whites having dispersed therein a proportion of a reaction product of pyro-phosphoric acid with an aliphatic alcohol containing a chain of at least eight carbon atoms and then folding sugar and flour thereinto.

16. The method of preparing non-shortening-containing baked products having excellent volume, taste and texture, comprising forming an aqueous solution or dispersion of a reaction product of pyro-phosphoric acid with a higher molecular weight alcohol, and then incorporating the same with egg whites, beating the modified egg whites, incorporating flour and sugar to form a batter, and baking the resultant batter.

17. The method of preparing non-shortening-containing cakes of the angel food type having excellent volume, taste and texture, comprising forming a batter containing flour, beaten egg whites, sugar, an edible acidifying agent, and a small proportion of a reaction product of pyro-phosphoric acid and an aliphatic alcohol containing at least eight carbon atoms, the pH of the batter being of the order of about 4.5 to 6.0, and then baking said batter.

18. An angel food cake baked from a batter having a pH between about 4.5 and 6.0 and containing flour, egg whites, sugar, moisture, and a small proportion of a reaction product of a poly-phosphoric acid with an aliphatic alcohol containing a chain of at least eight carbon atoms.

19. Flour batters, substantially devoid of shortening, containing flour, egg albumen, sugar, moisture, and a small proportion of a reaction product of a poly-phosphoric acid with a higher molecular weight alcohol.

20. An angel food cake containing flour, egg whites, sugar, moisture, and a small proportion of a reaction product of pyro-phosphoric acid with coconut oil mixed fatty alcohols.

21. A baked flour product, substantially free of shortening, and containing flour, egg whites, sugar, moisture, and a small proportion of a reaction product of a polyphosphoric acid with a lipophile material containing a member selected from the group consisting of at least one hydroxy group and at least one double bond, said lipophile material containing at least four carbon atoms.

22. A non-shortening-containing cake of the angel food type containing flour, egg whites, sugar, moisture, and a small proportion of a reaction product of a poly-phosphoric acid with a lipophile material containing a member selected from the group consisting of at least one hydroxy group and at least one double bond, said lipophile material containing at least four carbon atoms.

23. A non-shortening-containing flour composition containing, in addition to flour, beatable protein, sugar, moisture, and a proportion of a reaction product of a polyphosphoric acid with a lipophile material containing a member selected from the group consisting of at least one hydroxy group and at least one double bond, said lipophile material containing at least four carbon atoms.

24. A non-shortening-containing flour composition containing flour, egg material, sugar, moisture, and a proportion of a reaction product of pyro-phosphoric acid with a higher molecular weight aliphatic alcohol.

25. Cake, at least substantially devoid of shortening, containing flour, egg material, sugar, moisture, and between about 0.1% and 0.5%, based on the weight of the cake batter, of a reaction product of pyro-phosphoric acid with an alcohol containing at least four carbon atoms.

26. The method of preparing non-shortening-containing baked products having excellent volume, taste and texture, comprising forming an aqueous solution or dispersion of a reaction product of a poly-phosphoric acid with a higher molecular weight aliphatic alcohol, and then incorporating the same with beaten egg material, flour, and sugar to form a batter, and baking the resulting batter.

MORRIS B. KATZMAN.